No. 608,950. Patented Aug. 9, 1898.
H. J. BROOKES & A. B. DAVIS.
MANUFACTURE OF WHEEL HUBS AND MACHINERY THEREFOR.
(Application filed Dec. 24, 1897.)
(No Model.) 5 Sheets—Sheet 2.

WITNESSES
INVENTORS

No. 608,950. Patented Aug. 9, 1898.
H. J. BROOKES & A. B. DAVIS.
MANUFACTURE OF WHEEL HUBS AND MACHINERY THEREFOR.
(Application filed Dec. 24, 1897.)
(No Model.) 5 Sheets—Sheet 3.
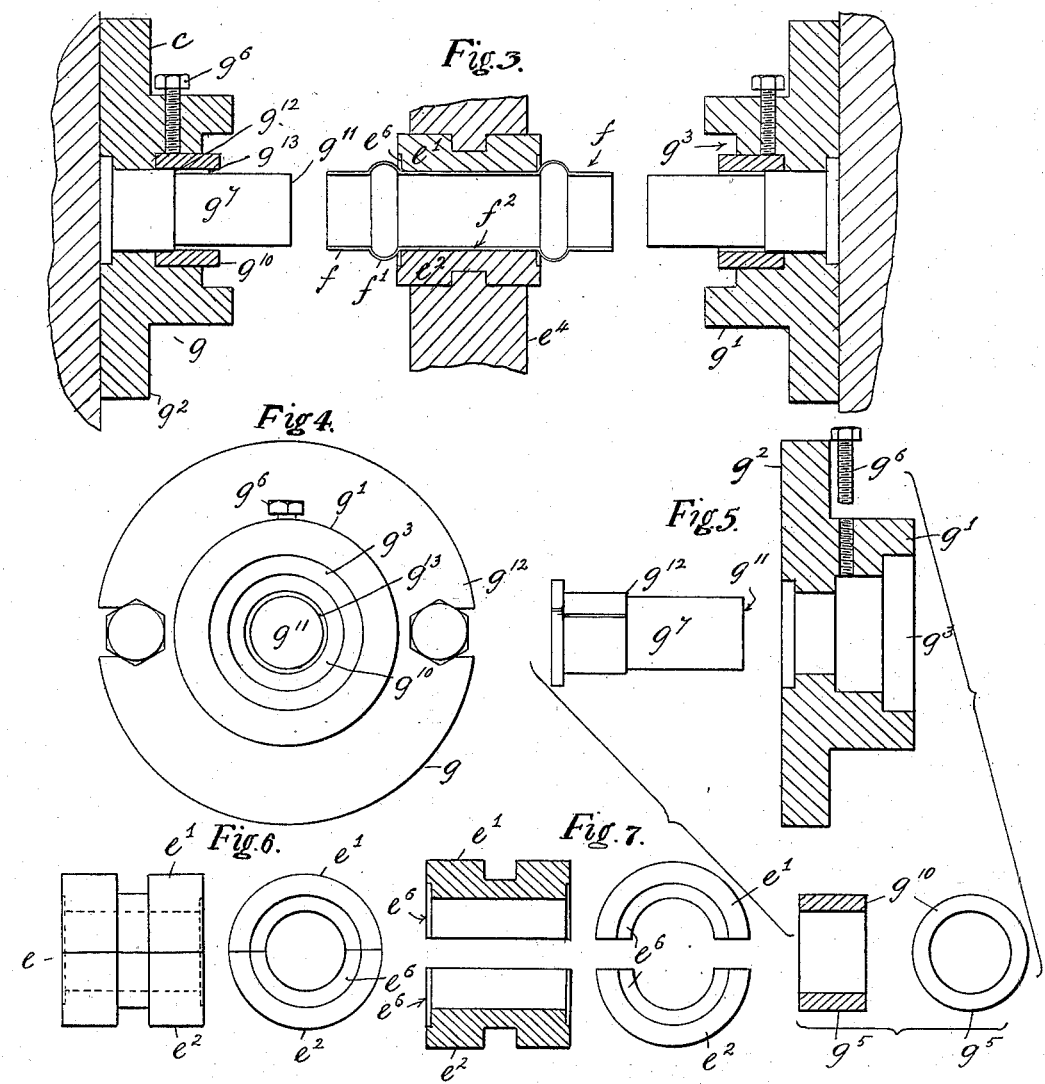
WITNESSES
INVENTORS No. 608,950. Patented Aug. 9, 1898.
H. J. BROOKES & A. B. DAVIS.
MANUFACTURE OF WHEEL HUBS AND MACHINERY THEREFOR.
(Application filed Dec. 24, 1897.)
(No Model.) 5 Sheets—Sheet 4.
Fig. 8. Fig. 9.
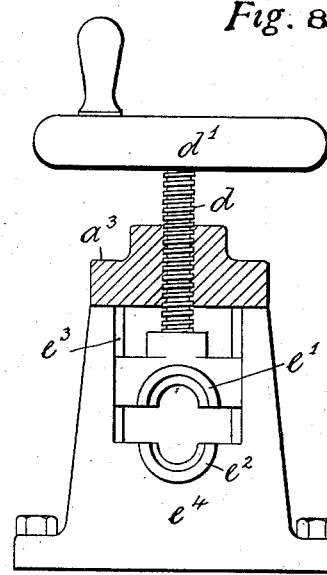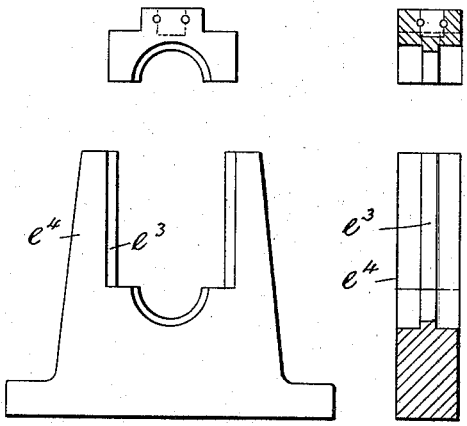
Fig. 10.
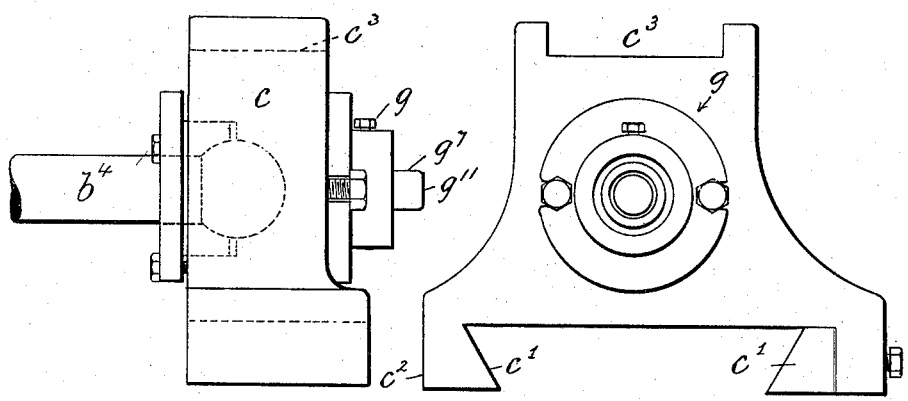
WITNESSES
INVENTORS No. 608,950. Patented Aug. 9, 1898.
H. J. BROOKES & A. B. DAVIS.
MANUFACTURE OF WHEEL HUBS AND MACHINERY THEREFOR.
(Application filed Dec. 24, 1897.)
(No Model.) 5 Sheets—Sheet 5.
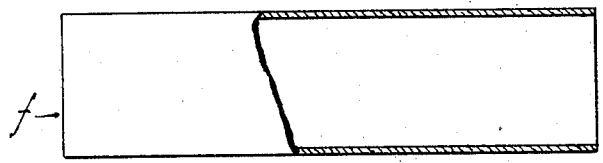
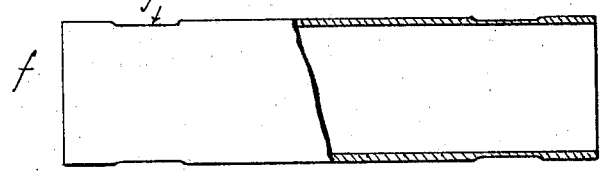
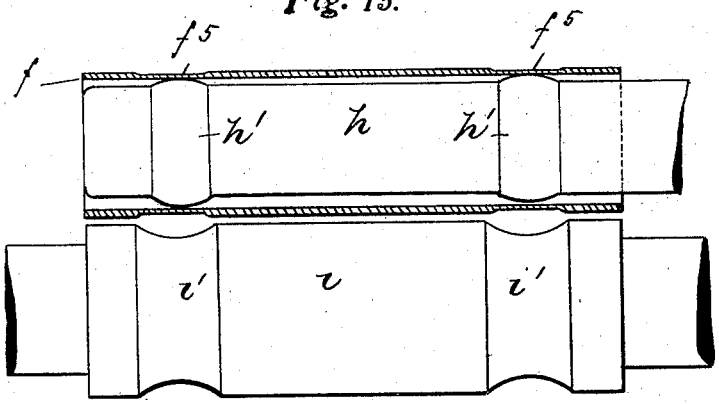
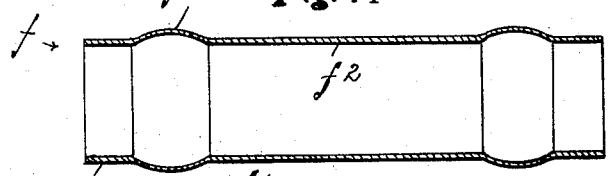
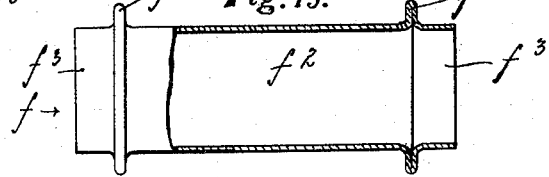
WITNESSES INVENTORS

UNITED STATES PATENT OFFICE.

HENRY JAMES BROOKES, OF CAPE HILL, AND ALFRED BENJAMIN DAVIS, OF WINSON GREEN, ENGLAND.

MANUFACTURE OF WHEEL-HUBS AND MACHINERY THEREFOR.

SPECIFICATION forming part of Letters Patent No. 608,950, dated August 9, 1898.

Application filed December 24, 1897. Serial No. 663,345. (No model.) Patented in England August 1, 1896, No. 17,070, March 16, 1897, No. 6,808, and July 31, 1897, No. 17,950.

*To all whom it may concern:*

Be it known that we, HENRY JAMES BROOKES, residing at Cape Hill, near the city of Birmingham, and ALFRED BENJAMIN DAVIS, engineer, residing at 6 Bacchus road, Winson Green, near Birmingham, England, subjects of the Queen of Great Britain, have invented certain new and useful Improvements in the Manufacture of Wheel-Hubs and in Machinery Therefor, of which the following is a specification, and for which invention we have obtained three several Letters Patent of Great Britain, dated, respectively, March 16, 1897, No. 6,808, July 31, 1897, No. 17,950, and August 1, 1896, No. 17,070.

This invention relates to the manufacture of hubs from tubular blanks and to the preparation of such blanks.

Figure 1:
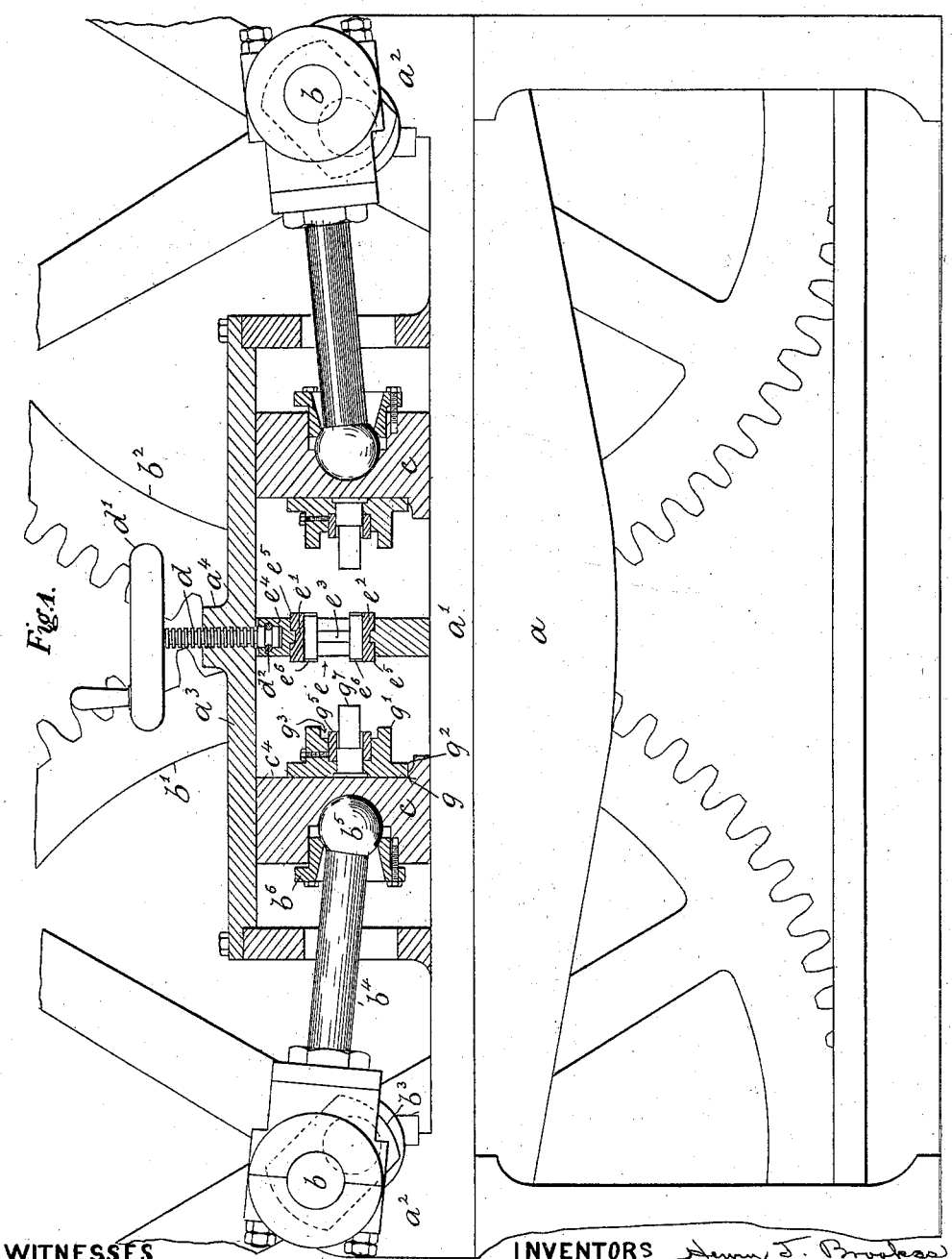
Figure 2:
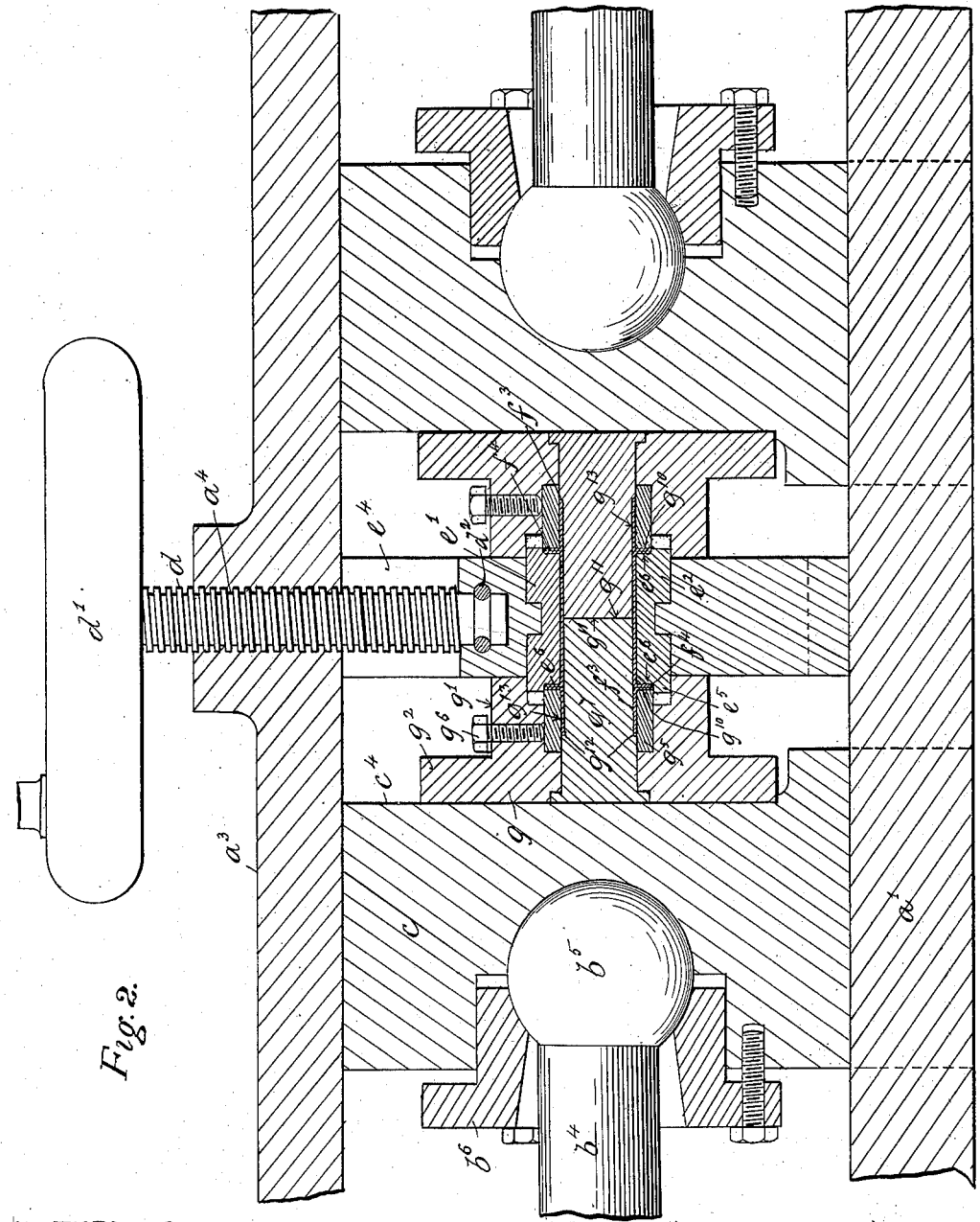

Figure 1 of the accompanying drawings represents, partly in elevation and partly in vertical section, a machine for forming the spoke-flanges of wheel-hubs by simultaneously collapsing or closing together the walls of annular swells, bulgings, or beadings of a tubular blank, said bulgings having been formed of previously thinned or reduced parts of the said blank by a previous operation or process. This view shows the parts of the machine in the positions they assume previous to a beaded blank being placed therein. Fig. 2 is a section, upon an enlarged scale, of the operating parts of the machine, but showing the blank in position and the bulgings collapsed to form the flanges. Fig. 3 is a sectional view of the acting parts of the machine upon the same scale as Fig. 2, showing the blank in position within the holding-die and with the plungers retired or before making their forward strokes for collapsing the bulgings. Fig. 4 is a front elevation of one of the plungers separately, and Fig. 5 represents the disassembled component parts of the same in section and in elevation. Fig. 6 represents in side elevation and end elevation the sections of the holding-die between which the blank is held while being operated upon, and Fig. 7 represents the said halves of the holding-die in end elevation and vertical section and separated from one another. Fig. 8 is a separate elevation and a vertical section of the blank-holding dies and their frame or support upon the same scale as Fig. 1. Fig. 9 is an elevation and a section of the framing of the blank-holder with the dies removed. Fig. 10 represents in front and side elevation one of the traversing slippers carrying the acting plunger, showing the dovetail bottom gap or saddle which takes over the correspondingly-formed bed of the machine and guides the said plunger in its reciprocating traverse. Fig. 11 represents the tubular blank from which a hub is made and previously to the circumferential thinning of the walls at parts where the bulgings are to come. Fig. 12 represents the blank thinned prior to bulging. Fig. 13 represents the open-ended and thinned blank in position upon a bulbed mandrel ready for the formation of the bulgings thereon by the double-grooved roller. Fig. 14 represents the said blank after the annular bulgings have been formed thereon. Fig. 15 represents the finished hub-shell with the flanges set up by flattening the bulbs in the machine hereinafter described.

The same letters of reference indicate corresponding parts in the several figures of the drawings.

$f$ is the tubular blank, which is thinned by turning or otherwise at the parts $f^3$ where the spoke-flanges are to come. The blank is then placed upon the double-bulbed mandrel $h$, Fig. 13, and the mandrel, which may either be rotated or remain stationary, is then brought up to or is approached by an outside rotating roller $i$, having annular grooves $i'$ corresponding to the bulbs $h'$ on the mandrel and the thin parts $f^5$ of the blank, and by the said parts being forced closer and closer together the thinned portions nipped between the mandrel-bulbs and roller-grooves are outwardly expanded into enlargements or bulbs $f'$, as represented in Fig. 14.

The machine for flattening the bulgings into spoke-flanges consists of a horizontal frame $a$, supporting a bed-plate $a'$, carrying at its opposite ends upright brackets or bearings $a^2$, wherein rotating crank-axles $b$, geared so as to turn together, but in opposite directions and at the same speed by intermeshing spur-wheels $b'$ $b^2$ on their ends, one of which is in connection with the driving-shaft or gearing, are mounted.

The cranks $b^3$ are connected, preferably by means of rods $b^4$, having spherical or ball ends $b^5$ working within adjustable sockets $b^6$, to and communicate to a pair of slippers or reciprocating carriers $c$, which move to and from upon the bed and are guided thereon at bottom by the dovetail edges $c'$ of the saddles $c^2$ and also at top by the bar $a^3$ of the frame, taking into the gaps $c^3$, while the middle part of the said bar has formed within it a screw-box $a^4$, wherethrough a rising and falling screw $d$, operated by a hand-wheel $d'$ at its upper end and carrying and being swivelly connected at its lower end $d^2$ to the upper part or movable section $e'$ of a horizontally-split blank-holding die, passes. This upper part of the split die is directed in its rising-and-falling movement by sliding on ribs or guides $e^3$ on the sides of the frame or holder $e^4$, mounted across the middle of bed-plate, while the lower section or part $e^2$ is stationary and is carried by and made a fixture to the said frame or holder. The split die has recesses $e^6$ in its ends, the faces of which form the acting parts and which recesses are filled up by the spoke-flanges when formed, while the said die is of a length equal to the distance between the bulgings or annular swellings $f'$ of the hub-blank $f$, and its bore is of an internal diameter equal to the outside diameter of the waist part $f^2$ of the said blank, which is placed between the dies and there clamped and held rigidly while being operated on by closing down the said dies through the screw and hand-wheel, while fitted or secured to the opposed faces $c^4$ of the slippers and in axial line with the bore of the split die are recessed plungers $g$, each consisting of a cylindrical sleeve $g'$, made fast to the slipper, and with a flanged end $g^2$, coming at the back, and an open mouth $g^3$, presented to the front or that part facing the split die. The open mouth may be formed of a greater internal diameter than the bulge, so as to take and slide or be guided over corresponding and extending end portions $e^5$ of the split die-sections, while the thrust or end pressure for upsetting the bulgings is effected by an inside annular shoulder or bush-die $g^5$, secured by pins $g^6$ or otherwise to the body of the plunger and surrounding the mandrel $g^7$, by which blank under operation is internally supported. Thus on the cranks being made to rotate in opposite directions the slippers are made to approach each other or toward the ends of the split die, when the bulged and unsupported parts near both ends of the blank are collapsed or crushed up between the opposed annular faces or acting ends $e^6$ $g^{10}$ of the die-sections and plungers on the said slippers coming full home, the blank being then fully supported internally by the mandrels $g^7$, whose ends $g^{11}$ come together at the middle of the bore of the said blank, while the shoulders $g^{12}$ thereon come against the extreme outer ends $f^3$ of the blank, with the portions outward of the flanges $f^4$ coming in the spaces $g^{13}$ between the mandrels and the encircling bush-dies $g^5$. This done, the slippers retire or make a back movement, leaving the blank with the said spoke-flanges $f^4$ formed thereon within the die, the upper part of which is lifted, and the barrel or other hub thus made is removed.

It is understood that it is not necessary for the sleeves or plungers to take over the ends of necks upon or extending parts of the die, as the crushing up of the unsupported bulgings of the blank may be effected simply between the opposed acting ends of the sleeve or bush-dies and the split holding-die.

Although we have described in the former arrangement the simultaneous collapsing of two bulges, yet it is understood that only one bulging may be upset at the same time.

Having fully described our invention, what we desire to claim and secure by Letters Patent is—

1. In machinery for producing the flanges of wheel-hubs by simultaneously collapsing previously-formed annular bulgings of a tubular blank, the combination with a sectional blank-holding die, of two advancing and retiring plungers having concentric mandrels to enter and support the tubular blank, and annular shoulders for acting with the ends of the blank-holding die to collapse the bulgings of the blank, substantially as described.

2. In machinery for producing the flanges of wheel-hubs by simultaneously operating upon and collapsing previously-formed annular bulgings of a tubular blank, the combination with a split or sectional blank-holding die, and advancing and retiring plungers, having acting shoulders or equivalents surrounding mandrels or internal supports for the blank, of slippers or reciprocating carriers, carrying the said plungers and traversing and being guided on a suitable bed, and with motion communicated to the same from shafts driven in opposite directions by gear, substantially as described and set forth.

In testimony whereof we have hereunto set our hands in presence of two subscribing witnesses.

HENRY JAMES BROOKES.
ALFRED BENJAMIN DAVIS.

Witnesses:
HENRY SKERRETT,
ARTHUR STADLER.